United States Patent
Melde-Tuczai et al.

(10) Patent No.: US 10,184,366 B2
(45) Date of Patent: Jan. 22, 2019

(54) VALVE ACTUATING DEVICE

(71) Applicant: AVL LIST GMBH, Graz (AT)

(72) Inventors: Helmut Melde-Tuczai, Graz (AT); Bernhard Hödl, Graz (AT); Andreas Zurk, Weinburg (AT)

(73) Assignee: AVL LIST GMBH, Graz (AT)

( * ) Notice: Subject to any disclaimer, the term of this patent is extended or adjusted under 35 U.S.C. 154(b) by 0 days.

(21) Appl. No.: 14/896,167

(22) PCT Filed: Jun. 17, 2014

(86) PCT No.: PCT/EP2014/062646
§ 371 (c)(1),
(2) Date: Dec. 4, 2015

(87) PCT Pub. No.: WO2014/202566
PCT Pub. Date: Dec. 24, 2014

(65) Prior Publication Data
US 2016/0130992 A1    May 12, 2016

(30) Foreign Application Priority Data
Jun. 18, 2013  (AT) .................................. 50395/2013

(51) Int. Cl.
*F01L 13/00* (2006.01)
*F01L 1/18* (2006.01)
(Continued)

(52) U.S. Cl.
CPC .......... *F01L 13/0063* (2013.01); *F01L 1/185* (2013.01); *F01L 3/10* (2013.01); *F01L 3/20* (2013.01);
(Continued)

(58) Field of Classification Search
CPC ............... F01L 13/0015; F01L 13/0021; F01L 13/0063; F01L 1/185; F01L 3/10; F01L 3/20; F16K 31/524
(Continued)

(56) References Cited

U.S. PATENT DOCUMENTS

| 4,986,227 A | 1/1991 | Dewey |
| 5,386,806 A * | 2/1995 | Allen ...................... F01L 1/143 123/90.16 |

(Continued)

FOREIGN PATENT DOCUMENTS

| DE | 3730001 | 3/1989 |
| GB | 2478559 | 9/2011 |

(Continued)

OTHER PUBLICATIONS

Machine Translation of JPS63-215807.*
(Continued)

*Primary Examiner* — Phutthiwat Wongwian
*Assistant Examiner* — Loren Edwards
(74) *Attorney, Agent, or Firm* — Dykema Gossett PLLC

(57) ABSTRACT

A valve actuating device for variable valve control wherein at least one articulation point between a valve lever and a gas exchange valve, or a force transmission element which acts on the gas exchange valve, is adjustable by way of an adjusting device which includes a piston displaceably mounted in the valve lever, a piston rod which is connected to the piston is connected in an articulated manner at a first articulation point to a first end of a push rod whose second end is connected in an articulated manner at a second articulation point to the gas exchange valve, or the force transmission part which acts on the gas exchange valve, the first articulation point being displaced in the longitudinal direction of the piston rod at least between a first position and a second position.

12 Claims, 2 Drawing Sheets

(51) Int. Cl.
*F01L 3/10* (2006.01)
*F01L 3/20* (2006.01)
*F16K 31/524* (2006.01)

(52) U.S. Cl.
CPC ....... *F01L 13/0015* (2013.01); *F01L 13/0021* (2013.01); *F16K 31/524* (2013.01)

(58) Field of Classification Search
USPC .......................................... 123/90.15, 90.16
See application file for complete search history.

(56) References Cited

U.S. PATENT DOCUMENTS 5,535,710 A * 7/1996 Zoschke ................ F01L 1/053
123/432
6,883,492 B2 * 4/2005 Vanderpoel ............... F01L 1/08
123/321
8,651,073 B2 2/2014 Cecur

FOREIGN PATENT DOCUMENTS

| JP | 55151106 | | 11/1980 | |
| JP | S60228716 | | 11/1985 | |
| JP | S63-215807 | * | 9/1988 | ............... F01L 1/18 |
| JP | S63215807 | | 9/1988 | |
| WO | 2012010081 | | 1/2012 | |

OTHER PUBLICATIONS

English Abstract of JP 55151106.
English Abstract of JP S6321807.
English Abstract of DE 3730001.
English Abstract of JP S60228716.

* cited by examiner

VALVE ACTUATING DEVICE

BACKGROUND OF THE INVENTION

Field Of The Invention

The invention relates to a valve actuating device for variable valve control of at least one gas exchange valve of an internal combustion engine which can be actuated via a camshaft and at least one valve lever, wherein at least one articulation point between the valve lever and the gas exchange valve, or a force transmission element which acts on the gas exchange valve, is formed to be adjustable via an adjusting device.

The Prior Art

A variable stroke of the valve is achieved in many cases by means of a so-called "lost motion" system. It is disadvantageous that for smaller strokes the transmission to the valve gear on the cam commences in a region in which there are no ramps. The consequence is a sudden acceleration of the valve gear, which causes an impact load. This impact needs to be dampened in order to avoid mechanical damage to the valve gear.

U.S. Patent No. 4,986,227 A and WO 2012/010081 A1 show valve actuating devices for at least one cam-actuated gas exchange valve, wherein the power transmission between the camshaft and the gas exchange valve occurs via a valve lever in which the rotational axis is adjustable.

A valve actuating device for at least one gas exchange valve which can be actuated via a cam follower by a camshaft is further known from JP 55-151 106 A2, wherein the linkage point of the cam follower on the gas exchange valve can be changed by a rocker arm.

It is the object of the invention to provide a valve actuating device in the simplest possible way in which mechanical damage by impact loads are avoided, without any additional damping measures.

SUMMARY OF THE INVENTION

This is achieved in accordance with the invention in such a way that the adjusting device comprises a piston which is displaceably mounted in the valve lever and adjoins at least one pressure chamber which can be filled with an actuating medium, wherein a piston rod which is connected to the piston is connected in an articulated manner at a first articulation point to a first end of a push rod, the second end of which is connected in an articulated manner at a second articulation point to the gas exchange valve or the force transmission part which acts on the gas exchange valve, so that the first articulation point can be displaced in the longitudinal direction of the piston rod at least between a first position and a second position.

It is especially advantageous if the first articulation point is arranged in the first position in the rotational axis of the valve lever, said first position preferably corresponding to a first end position. If the first articulation point is pushed into the rotational axis of the valve lever, the first articulation point, and thus also the gas exchange valve, does not perform any lifting movement. As a result, the lifting movements of the gas exchange valve can be adjusted continuously between a zero adjustment and a maximum lifting movement without producing impact loads by a sudden acceleration of the valve gear.

The maximum lifting movement is defined by the second position of the first articulation point, which can be formed by a second end position. The greatest possible valve lifts in the second position are enabled when the first articulation point is arranged in the second end position in the region of the longitudinal axis of the gas exchange valve or the force transmission element.

Simple adjustment of the valve actuating device can occur when the piston is formed as a double-acting piston, wherein the piston adjoins a first pressure chamber with a first face end and a second pressure chamber with a second face end facing away from the first face end, wherein it is especially advantageous if at least one respective pressure channel opens into each pressure chamber, wherein preferably the pressure channels of the two pressure chambers are controlled via a common slide valve.

In order to prevent a detachment of the valve lever from the actuating cam, it can be provided that the valve lever is pressed by means of a return spring against the actuating cam of the camshaft, wherein preferably the actuating cam and the return spring act at different ends on the valve lever. The return spring prevents the valve lever from losing its contact with the actuating cam.

A very simple configuration is obtained when the valve lever is formed as a cam follower. The valve actuating device can comprise one valve lever per gas exchange valve or per gas exchange valve group. It is especially advantageous if a gas exchange valve group, consisting of two similar gas exchange valves of a cylinder, is actuated by a valve lever, wherein preferably the force transmission element is formed by a pressure rod of a valve bridge acting on at least two gas exchange valves.

The invention will be explained below in greater detail by reference to the enclosed drawings.

DETAILED DESCRIPTION

Figure 1:
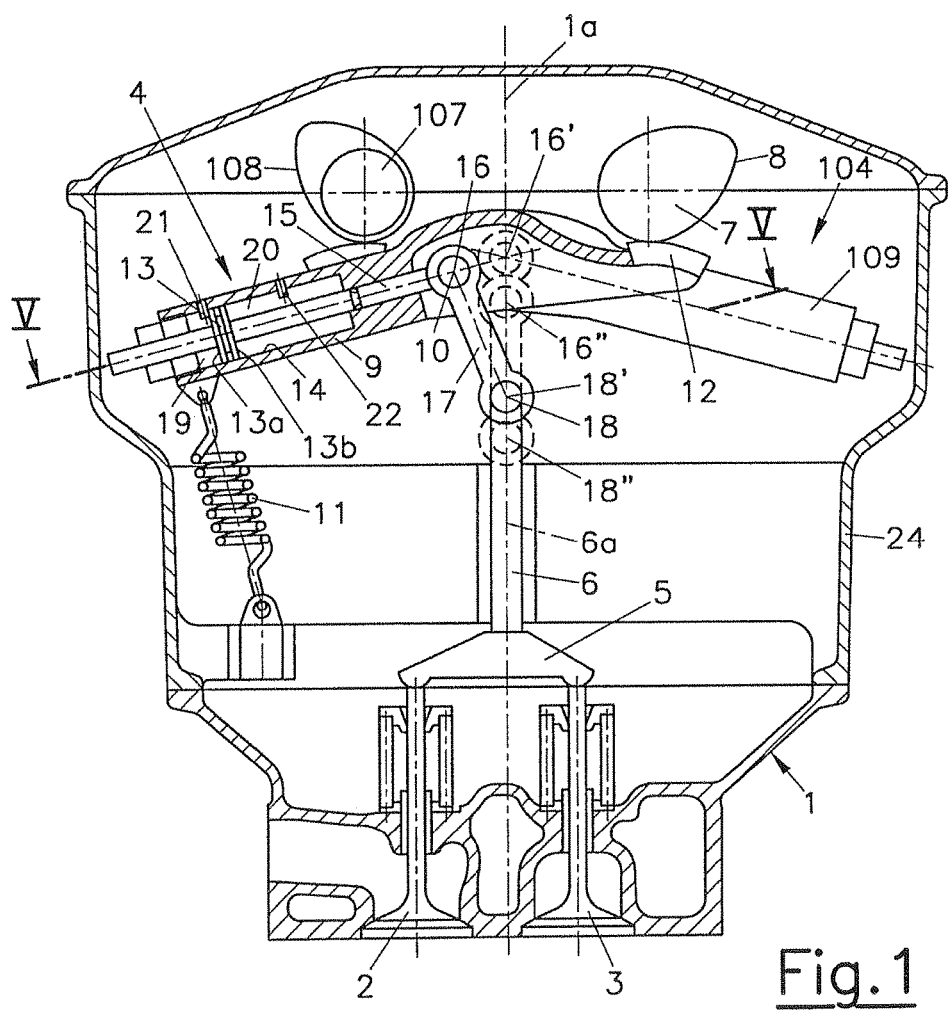
FIG. 1 shows a sectional view of a cylinder head of an internal combustion engine with a valve actuating device in accordance with the invention in a sectional view along the line I-I in FIG. 5.

FIG. 1 shows a cylinder head 1 and a valve gear housing 24 with two gas exchange valves 2, 3, which can be actuated via a valve actuating device 4. The gas exchange valves 2, 3 can be intake or exhaust valves. In the embodiment, the two gas exchange valves 2, 3 are actuated by a valve bridge 5 and a pressure rod 6. The valve actuating device 4 comprises a camshaft 7 which is rotatably mounted in the cylinder head 1 and comprises at least one actuating cam 8, which acts on a valve lever 9 formed by a cam follower. The valve lever 9 is rotatably mounted in a rotational axis 10 in the cylinder head 1 or in the valve gear housing 24. The valve lever 9 is pressed against the cam 8 of the camshaft 7 via a return spring 11. In the embodiment, the actuating cam 8 and the return spring 11 act on different ends of the valve lever 9, wherein the actuating cam 8 acts on the contact finger 12 of the valve lever. The illustrated contact between the actuating cam 8 and the valve lever 9 is formed in FIG. 1 as a sliding contact. The contact can also occur via a roller (not shown).

In the valve lever 9, a piston 13 is displaceably mounted in a cylinder 14 formed by the valve lever 9. The piston 13 is connected to a piston rod 15, which is connected on its part in an articulated manner at a first articulation point 16 to a push rod 17. The push rod 17 is connected in an articulated manner at a second articulation point 18 to the pressure rod 6, which acts via the valve bridge 5 on the gas exchange valves 2, 3. As a result of the actuation of the piston 13, a displacement of the first articulation point 16 occurs and thus an influence is made on the lifting movement of the gas exchange valves 2, 3. The actuation of the piston 13 preferably occurs via a hydraulic actuating medium, wherein the piston 13 is formed in the embodiment as a double-acting piston. In this case, a first face end 13a of the piston adjoins a first pressure chamber 19 and a second face end 13b which faces away from the first face end 13a adjoins a second pressure chamber 20. The two pressure chambers 19, 20 can be supplied independently from each other with an actuating medium such as motor oil via the first and second pressure channels P1 and P2. The piston 13 and the piston rod 15 can thus be moved via the oil pressure in the longitudinal direction of the valve lever 9 either in the direction of the contact finger 12 or away therefrom, depending on which of the pressure channels P1, P2 is supplied with a pressure medium. The piston 13 is moved in a reciprocating manner by the oil pressure between the stops consisting of the pins 21, 22.

In the first end position of the piston 13 as shown in FIG. 1, the first articulation point 16 lies precisely in the rotational axis 10 of the valve lever 9. The push rod 17 is connected via the second articulation point 18 to the pressure rod 6. In this position, no lifting movement is transferred to the pressure rod 6. If on the other hand the piston rod 15 is extended in the direction of the contact finger 12 to the second end position, the first articulation point 16 reaches the position 16'. The respective position of the second articulation point is designated with reference numeral 18'. During further rotation of the actuating cam 8, the cam lift is transferred in a reduced manner to the push rod 17 at the ratio according to the distances. The first articulation point 16 reaches the position 16" from the position 16' by the lift of the cam, and the second articulation point from the position 18' to the position 18". The pressure rod 6 presses the valve bridge 5 and thus the gas exchange valves 2, 3 in FIG. 1 in the downward direction, and the two gas exchange valves 2, 3 are opened. For maximum lift, the first articulation point 16 lies in the second end position in the region of the longitudinal axis 6a of the pressure rod 6.

Each valve group, which consists of two similar gas exchange valves 2, 3, can be installed in a mirrored arrangement in the cylinder 1 and can be actuated via a separate cam follower 109, on which the actuating cam 108 of a separate camshaft 107 acts, wherein the valve actuating devices 4, 104 for the different valve groups, especially the valve levers 9, 109, the camshafts 7, 107, etc., are arranged in a mirrored manner with respect to the central plane la of the cylinder head 1.

Each of the pressure channels P1, P2 comprises several pressure boreholes and grooves which are formed in the cylinder head 1 or the valve gear housing 24, or the valve lever 9. The first pressure channels P1 comprises the first pressure boreholes and the grooves 28, 29, 33, 37, 38, 39, 40, and the second pressure channel P2 comprises the second pressure boreholes and the grooves 30, 31, 34, 41, 42, 43, 44.

Figure 2:
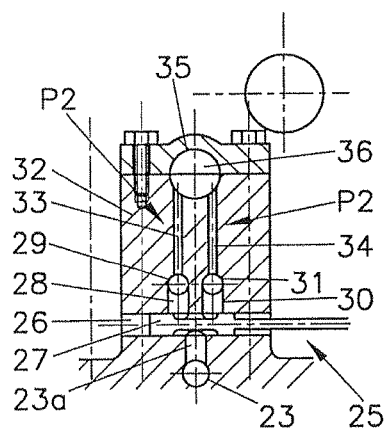
FIG. 2 shows an adjusting gate valve in a sectional view along the line II-II in FIG. 5 in a middle position.
Figure 3:
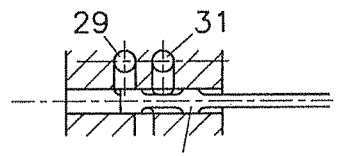
FIG. 3 shows the adjusting gate valve in a first end position.
Figure 4:
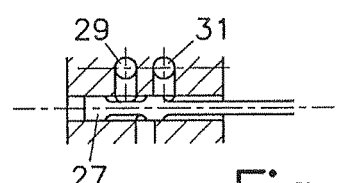
FIG. 4 shows the adjusting gate valve in a second end position.
Figure 5:
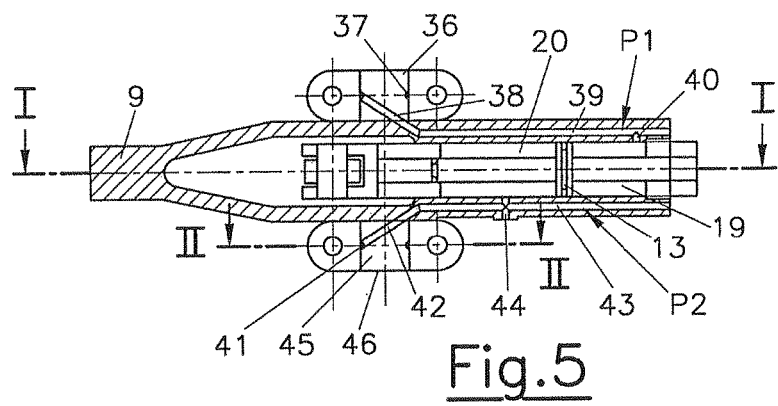
FIG. 5 shows the valve actuating device in a sectional view along the line V-V in FIG. 1.

The oil supply of the first and second pressure chambers 19, 20 for pressurising the piston 13 occurs via a supply borehole 23 in the cylinder head 1 or in the valve gear housing 24. Each valve group, which consists of the intake or exhaust valves, is controlled via a separate slide valve 25, which comprises a sliding piston 27 which is displaceably arranged in a sliding borehole 26. The actuation of the sliding piston 27, which can occur mechanically, pneumatically, hydraulically or electrically in the known manner, is not an element of the invention. The supply borehole 23 is connected at one point via a connecting borehole 23a to the sliding borehole 26. Depending on its position, the sliding piston 27 moves once into the first borehole 28 which leads into the first distribution and collecting borehole 29, or it moves into the second borehole 30 which leads into the other second distribution and collecting borehole 31. In each bearing bracket 32 of the valve lever 9 there is a respective first borehole 33 which is in connection with the first distribution and collecting line 29, or a second borehole 34 which is in connection with the second distribution and collecting borehole 31. When the sliding piston 27 connects both boreholes 28 and 30 simultaneously, all boreholes of the first and the second pressure channels are under pressure and the piston rod 15 is tightly held. This position is shown in FIG. 2. The piston rod 15 is displaced in the longitudinal direction of the valve lever 9 in all other positions. FIG. 3 shows the second end position of the sliding piston 27 for an extension of the piston rod 15, and FIG. 4 shows the first end position of the sliding piston 27 for a retraction of the piston rod 15. If only one of the boreholes 28, 30 is pressurised, the pressure is relieved in the respective other borehole 30 or 28.

The oil reaches the first bearing hole 35 of the valve lever 9 from the borehole 33. The first bearing pin 36 of the valve lever 9 comprises a circumferential first groove 37, from which the actuating medium reaches the exterior side of the piston 13 in the first pressure chamber 19 via the first boreholes 38, 39 and 40. In this position, the piston rod 15 is extended, and is therefore moved in the direction of the contact fingered 12 to the second end position. The pressure medium on the inner side of the piston 13 in the second pressure chamber 20 reaches the second groove 41 via the second boreholes 44, 43, 42 in the second bearing pin 45 opposite the first bearing pin 36 to the second ball 46 of the valve lever 9. The discharge of oil occurs there via the second borehole 34 to the second distribution and collecting line 31. The slide valve 25 releases the discharge of oil to the cylinder head region via the second borehole 30. As a result, the piston 13 can be moved up to the stop formed by the pin 22 to the second end position by the pressure in the first pressure chamber 19.

The invention claimed is:

1. A valve actuating device for variable valve control of a gas exchange valve in a cylinder head of an internal combustion engine which can be actuated via a camshaft and a valve lever, the valve lever being rotatably mounted around a rotational axis in the cylinder head, wherein at least one articulation point between the valve lever and the gas exchange valve or a force transmission element which acts on the gas exchange valve is adjustable via an adjusting device, wherein the adjusting device comprises a piston which is displaceably mounted in and movable in a longitudinal direction of the valve lever, said piston adjoining at least one pressure chamber which can be filled with an actuating medium, wherein a piston rod which is connected to the piston is rotatably connected to a first end of a push rod at a first articulation point, wherein a second end of the push rod is rotatably connected to the gas exchange valve, or the force transmission element which acts on the gas exchange valve, at a second articulation point, so that the first articulation point can be displaced in a longitudinal direction of the piston rod at least between a first position and a second position, and wherein in the first position the first articulation point is arranged in the rotational axis of the valve lever, the valve lever being rotatably mounted around the rotational axis in the cylinder head.

2. The valve actuating device according to claim 1, wherein the first articulation point is arranged in the second position along a longitudinal axis of the gas exchange valve or the force transmission element.

3. The valve actuating device according to claim 1, wherein the piston is a double-acting piston, wherein the piston adjoins a first pressure chamber with a first face end and a second pressure chamber with a second face end facing away from the first face end.

4. The valve actuating device according to claim 3, wherein at least one respective pressure channel opens into each pressure chamber.

5. The valve actuating device according to claim 4, including a common slide valve for controlling the pressure chambers.

6. The valve actuating device according to claim 1, including a return spring connected to the valve lever for pressing the valve lever against an actuating cam of the camshaft.

7. The valve actuating device according to claim 6, wherein the actuating cam and the return spring act at different ends on the valve lever.

8. The valve actuating device according to claim 1, wherein the valve actuating device comprises one valve lever per gas exchange valve or per gas exchange valve group.

9. The valve actuating device according to claim 1, wherein the valve lever comprises a cam follower.

10. The valve actuating device according to claim 1, wherein the force transmission element comprises a pressure rod of a valve bridge acting on at least two gas exchange valves.

11. The valve actuating device according to claim 1, wherein the first articulation point is arranged in a first end position in the rotational axis of the valve lever.

12. The valve actuating device according to claim 1, wherein the first articulation point is arranged in a second end position along a longitudinal axis of the gas exchange valve or the force transmission element.

* * * * *